US006658471B1

(12) United States Patent
Berry et al.

(10) Patent No.: US 6,658,471 B1
(45) Date of Patent: Dec. 2, 2003

(54) METHOD AND SYSTEM FOR ZERO OVERHEAD SOFTWARE PERFORMANCE MEASUREMENT INSTRUMENTATION

(75) Inventors: Robert Francis Berry, Austin, TX (US); Raymond Morris Bryant, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 713 days.

(21) Appl. No.: 09/607,172

(22) Filed: Jun. 29, 2000

(51) Int. Cl.[7] .............................................. G06F 15/173
(52) U.S. Cl. ....................... 709/224; 709/226; 717/140; 717/150
(58) Field of Search ................................. 709/107–108, 709/224–226, 253; 712/216, 228; 717/136, 140, 150, 151, 154

(56) References Cited

U.S. PATENT DOCUMENTS

| 5,781,737 | A | * | 7/1998 | Schmidt ..................... 709/224 |
| 5,857,076 | A | * | 1/1999 | Schmidt ..................... 709/224 |
| 5,859,999 | A | * | 1/1999 | Morris et al. ............... 712/224 |
| 5,938,722 | A | * | 8/1999 | Johnson ...................... 709/226 |
| 6,044,221 | A | * | 3/2000 | Gupta et al. ................ 717/151 |
| 6,199,095 | B1 | * | 3/2001 | Robinson .................... 709/107 |
| 6,505,345 | B1 | * | 1/2003 | Chen et al. .................. 717/154 |
| 6,571,385 | B1 | * | 5/2003 | Muthukumar et al. ...... 717/150 |

OTHER PUBLICATIONS

Diefendorff, K., "The Russians Are Coming: Supercomputer Maker Elbrus Seeks to Join X86/IA–64 Melee", Microprocessor Report, 2, 13, Feb. 15, 1999.

Gwennap. L., "IA–64: A Parallel Instruction Set: Register Frames, X86 Mode, Instruction Set Disclosed", Microprocessor Report, 7, 13, May 31, 1999.

Song, P., "Demystifying EPIC and IA–64", Microprocessor Report, pp. 21–27, Jan. 26, 1998.

Pierce et al., "Optimizing Your Code for IA–64", Intel Developer Update Magazine, pp. 3–7, Mar. 2000.

Dulong et al., "An Overview of the Intel IA–64 Compiler", Intel Technology Journal, pp. 1–15, Q4, 1999.

* cited by examiner

Primary Examiner—Bharat Barot
(74) Attorney, Agent, or Firm—Leslie A. Van Leeuwen; Joseph R. Burwell (57) ABSTRACT

A method, system, and computer program product is presented for minimizing overhead that may be incurred by executing specialized code, such as debug code or instrumentation code for monitoring the performance of the application, that is present within an application. The application executes on a data processing system having a processor containing predicate registers. The application is compiled in a manner in which the processor instructions for the specialized code are predicated using a set of one or more predicate registers that are dedicated or reserved by software convention for predicating the specialized code. In other words, for a given application, compilers and other sources of machine instructions do not generate any predicated processor instructions, other than processor instructions for the specialized code, which use the reserved predicate registers. When the application executes, neither the operating system nor other applications use the reserved predicate registers. An operating system function can be called or invoked to set the values of the reserved predicate registers so that the specialized code either does or does not execute in a chosen manner. Alternatively, the processor contains a set of special predicate registers that are reserved for predicating instrumentation code rather than protecting a set of predicate registers through software convention.

27 Claims, 5 Drawing Sheets

PSEUDO-CODE DESCRIPTION OF CONDITIONALLY EXECUTING AN INSTRUMENTED SPIN LOCK (401) CHECK IF SPIN LOCK INSTRUMENTATION IS ENABLED; IF NOT, GOTO STEP 403
(402) CALL INSTRUMENTED SPIN LOCK ROUTINE; ON RETURN, GOTO STEP 404
(403) TEST-AND-SET A BIT IN THE SPIN LOCK; IF "1" RETURNED, GOTO STEP 405
(404) PROCEED WITH CODE THAT DEPENDS ON THE LOCK BEING ACQUIRED

OUT OF THE NORMAL INSTRUCTION PATH:
    (405) SPIN FOR THE LOCK; WHEN AVAILABLE, GOTO STEP 404

*FIG. 4A*

PSEUDO-CODE DESCRIPTION OF PREDICATING AN INSTRUMENTED SPIN LOCK

[PR1] (411) CALL INSTRUMENTED SPIN LOCK ROUTINE
[PR2] (412) TEST-AND-SET A BIT IN THE SPIN LOCK; IF "1" RETURNED, GOTO STEP 414
    (413) PROCEED WITH CODE THAT DEPENDS ON THE LOCK BEING ACQUIRED OUT OF THE NORMAL INSTRUCTION PATH:
    (414) SPIN FOR THE LOCK; WHEN AVAILABLE, GOTO STEP 413

*FIG. 4B*

METHOD AND SYSTEM FOR ZERO OVERHEAD SOFTWARE PERFORMANCE MEASUREMENT INSTRUMENTATION

BACKGROUND OF THE INVENTION

1. Field of the Invention

The present invention relates to an improved data processing system and, in particular, to a method and apparatus for optimizing performance in a data processing system. Still more particularly, the present invention provides a method and apparatus for enhancing performance of a software program through performance instrumentation.

2. Description of Related Art

Effective management and enhancement of data processing systems requires knowing how and when various system components are operating. In analyzing and enhancing performance of a data processing system and the applications executing within the data processing system, it is helpful to gather information about a data processing system as it is operating.

By instrumenting an application, trace information can be gathered for an application while it is executing. For example, an instrumented application may log every entry and corresponding exit into and from a module, subroutine, method, function, or system component within the executing application. Typically, a time-stamped record is produced for each such event. Corresponding pairs of records similar to entry-exit records may also be used to trace execution of arbitrary code segments, the commencement and completion of I/O or data transmission, and for many other events of interest. Output from instrumentation code may be analyzed in many ways to identify a variety of performance metrics with respect to the execution environment.

However, instrumenting an application to enable collection of trace data may undesirably disturb the execution of the application. After performance measurement instrumentation is added to a program, as the application executes, the instrumentation code may cause significant overhead, such as system calls to obtain a current timestamp or other execution state information.

In order to minimize the undesired effects of instrumentation, the execution of instrumentation code is limited in some manner. Typically, the performance instrumentation is toggled on or off through the use of one or more globally addressable variables that bracket sections of instrumentation code within the instrumented application. As performance instrumentation code is encountered, the global variable is tested to determine whether or not the instrumentation code should be executed. However, even when the instrumentation is turned off, the overhead of testing a global variable may add unacceptable delay to the performance of the application; the execution of the instructions for testing a global variable not only consumes CPU time but may cause the flushing of the instruction cache or instruction pipeline within the processor. Hence, production software is generally shipped without any installed performance instrumentation, and when a performance problem arises at a later time, a version of the production software that contains performance. instrumentation must be built and installed before performance problems can be diagnosed, which is a cumbersome and time-consuming process.

Therefore, it would be advantageous to provide a method and system for eliminating overhead effects of performance instrumentation when the execution of the instrumentation code is unnecessary. It would be particularly advantageous to provide a methodology that allows the performance instrumentation to be present within production-quality software.

SUMMARY OF THE INVENTION

The present invention is a method, system, apparatus, or computer program product for minimizing overhead that may be incurred by executing specialized code, such as debug code or instrumentation code for monitoring the performance of the application, that is present within an application. The application executes on a data processing system having a processor containing predicate registers. The application is compiled in a manner in which the processor instructions for the specialized code are predicated using a set of one or more predicate registers that are dedicated or reserved by software convention for predicating the specialized code. In other words, for a given application, compilers and other sources of machine instructions do not generate any predicated processor instructions, other than processor instructions for the specialized code, which use the reserved predicate registers. When the application executes, neither the operating system nor other applications use the reserved predicate registers. An operating system function can be called or invoked to set the values of the reserved predicate registers so that the specialized code either does or does not execute in a chosen manner. Alternatively, the processor contains a set of special predicate registers that are reserved for predicating instrumentation code rather than protecting a set of predicate registers through software convention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1A:
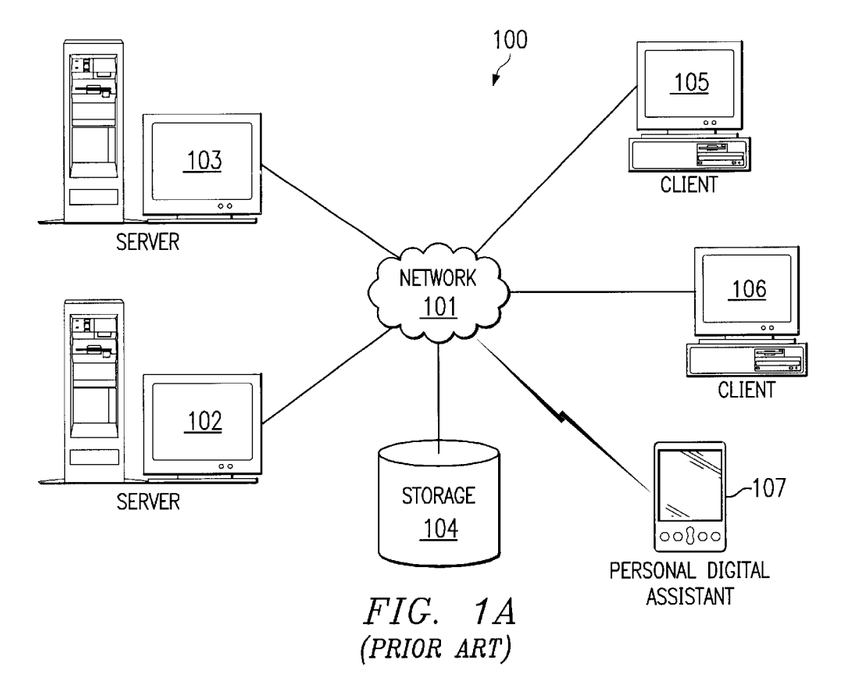
FIG. 1A depicts a typical distributed data processing system in which the present invention may be implemented.

With reference now to the figures, FIG. 1A depicts a typical distributed data processing system in which the present invention may be implemented. Distributed data processing system 100 contains network 101, which is the medium used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105–107 also are connected to network 101. Clients 105–107 may be a variety of computing devices, such as personal computers, personal digital assistants (PDAs), etc. Distributed data processing system 100 may include additional servers, clients, and other devices not shown. In the depicted example, distributed data processing system 100 may include the Internet with network 101 representing a worldwide collection of networks and gateways that use the TCP/IP suite of protocols to communicate with one another. Of course, distributed data processing system 100 may also be configured to include a number of different types of networks, such as, for example, an intranet, a local area network (LAN), or a wide area network (WAN).

FIG. 1A is intended as an example of a heterogeneous computing environment and not as an architectural limitation for the present invention. The present invention could be implemented on a variety of hardware platforms, such as server 102 or client 107 shown in FIG. 1A. Requests for the collection of performance metric information may be initiated on a first device within the network, while a second device within the network receives the request, collects the performance metric information for applications executing on the second device, and returns the collected data to the first device.

Figure 1B:
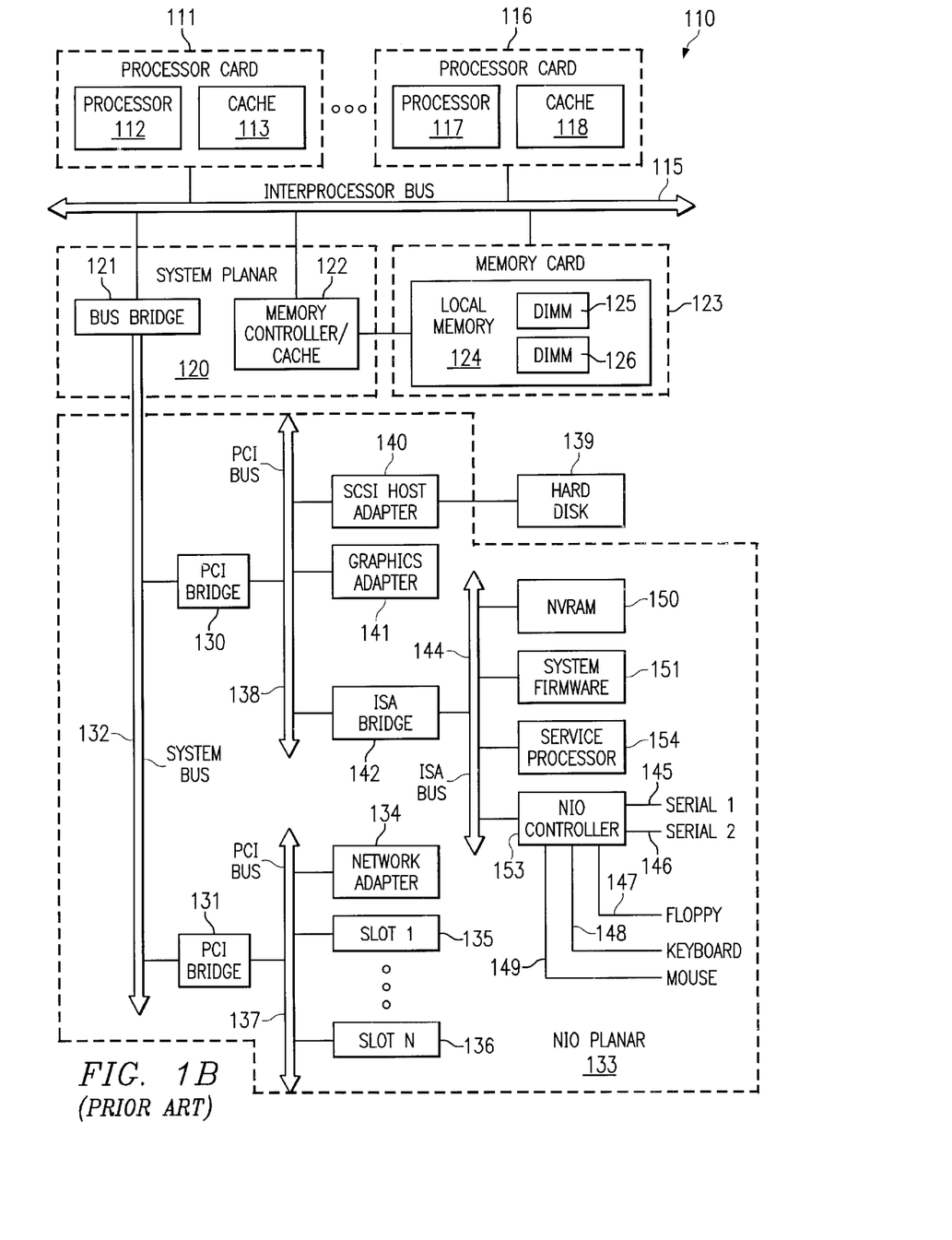
FIG. 1B depicts a typical computer architecture that may be used within a client or server in which the present invention may be implemented.

With reference now to FIG. 1B, a diagram depicts a typical computer architecture that may be used within a client or server, such as those shown in FIG. 1A, in which the present invention may be implemented. Data processing system 110 employs a variety of bus structures and protocols. Processor card 111 contains processor 112 and L2 cache 113 that are connected to interprocessor bus 115. System 110 may contain a plurality of processor cards; processor card 116 contains processor 117 and L2 cache 118.

Interprocessor bus 115 supports system planar 120 that contains bus bridge 121 and memory controller 122 that supports memory card 123. Memory card 123 contains local memory 124 consisting of a plurality of dual in-line memory modules (DIMMs) 125 and 126.

Interprocessor bridge 121 connects to PCI bridges 130 and 131 via system bus 132. PCI bridges 130 and 131 are contained on native I/O (NIO) planar 133 which supports a variety of I/O components and interfaces. PCI bridge 131 provides connections for external data streams through network adapter 134 and a number of card slots 135–136 via PCI bus 137. PCI bridge 130 connects a variety of I/O devices via PCI bus 138. Hard disk 139 may be connected to SCSI host adapter 140, which is connected to PCI bus 138. Graphics adapter 141 may also be connected to PCI bus 138 as depicted, either directly or indirectly.

ISA bridge 142 connects to PCI bridge 130 via PCI bus 138. ISA bridge 142 provides interconnection capabilities through NIO controller 153 via ISA bus 144, such as serial connections 145 and 146. Floppy drive connection 147 provides removable storage. Keyboard connection 148 and mouse connection 149 allow data processing system 110 to accept input data from a user.

Non-volatile RAM (NVRAM) 150 provides non-volatile memory for preserving certain types of data from system disruptions or system failures, such as power supply problems. System firmware 151 is also connected to ISA bus 144 and controls the initial BIOS. Service processor 154 is connected to ISA bus 144 and provides functionality for system diagnostics or system servicing.

Those of ordinary skill in the art will appreciate that the hardware in FIG. 1B may vary depending on the system implementation. For example, the system may have one or more processors, and other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments.

Figure 1C:
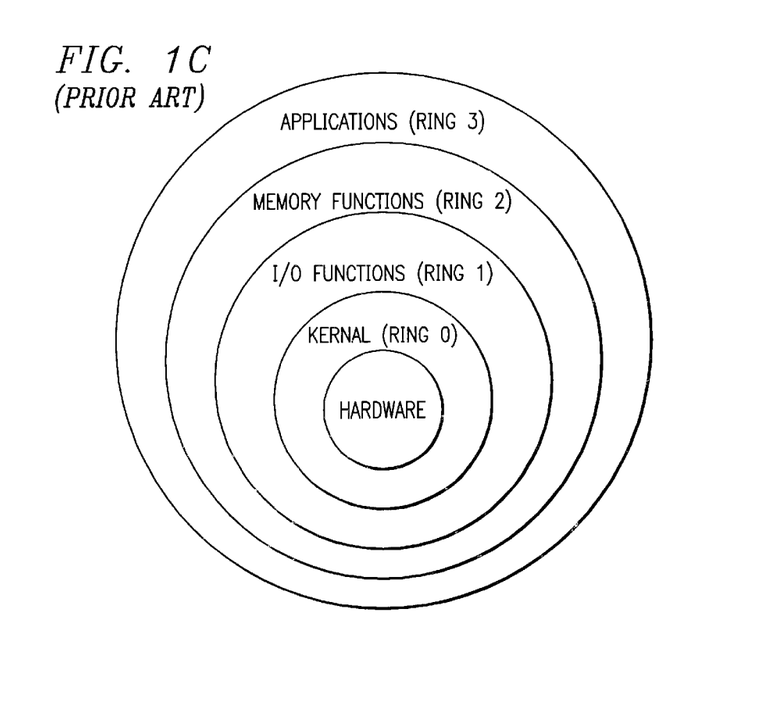
FIG. 1C depicts typical software components within a computer system illustrating a logical relationship between the components as functional layers of software.

With reference now to FIG. 1C, a prior art diagram shows software components within a computer system illustrating a logical relationship between the components as functional layers of software. The kernel (Ring 0) of the operating system provides a core set of functions that acts as an interface to the hardware. I/O functions and drivers can be viewed as resident in Ring 1, while memory management and memory-related functions are resident in Ring 2. User applications and other programs (Ring 3) access the functions in the other layers to perform general data processing. Rings 0–2, as a whole, may be viewed as the operating system of a particular device. Assuming that the operating system is extensible, software drivers may be added to the operating system to support various additional functions required by user applications, such as device drivers for support of new devices added to the system.

The present invention may be implemented on a variety of hardware and software platforms, as described above. More specifically, though, the present invention is directed to a methodology for eliminating overhead effects of performance instrumentation when the execution of the instrumentation code is unnecessary, and the methodology allows the performance instrumentation to be present within production-quality software.

As noted previously, the prior art teaches that instrumenting an application to enable tracing may undesirably disturb the execution of the application because, as the instrumented application executes, the instrumentation code may cause significant overhead. In order to reduce the overhead of performance instrumentation, the execution of instrumentation code is limited in some manner in the prior art. Typically, the performance instrumentation is toggled on or off through the use of one or more globally addressable variables that bracket sections of instrumentation code within the instrumented application. As performance instrumentation code is encountered, the global variable is tested to determine whether or not the instrumentation code should be executed.

Instead of using one or more global variables, the present invention introduces the novel approach of using dedicated predicate registers to control whether performance instrumentation code is enabled within an application.

Predicate registers are implemented in a variety of processor architectures, such as the general class of computers that uses the term Explicitly Parallel Instruction Computer (EPIC), of which the Intel IA-64 architecture is merely one example. While some of the examples discussed below explicitly refer to the IA-64 architecture, the present invention may be implemented on any processor architecture supporting a predication mechanism.

In order to support the ability to execute numerous instructions in parallel, the IA-64 architecture is massively resourced with a large number of general and special purpose registers that enable multiple computations to be performed without having to frequently save and restore intermediate data to and from memory. An IA-64 compiler has several primary register stacks available: 128 64-bit general-purpose registers that are used to hold values for integer and multimedia computations; 128 82-bit floating-point registers that are used for floating-point computations; 8 64-bit branch registers that are used to specify the target addresses of indirect branches; and 64 one-bit predicate registers (PR0–PR63) that control conditional execution of instructions and conditional branches, in which the first register PR0 is read-only and always reads as a one or true.

In a processor containing predicate registers, almost all instructions can be tagged with a guarding predicate. If the value of the guarding predicate is false at execution time, then the predicated instruction's architectural updates are suppressed, and the instruction behaves like a NOP (no-operation). If the predicate is true, then the instruction behaves as if it were unpredicated. Typically, a predicate is stored as one-bit values in which a predicate of zero is interpreted as false and a predicate of one is interpreted as true.

As is well known in the prior art, branches within the execution control flow of an application can decrease performance by consuming hardware resources for branch prediction at execution time and by restricting instruction scheduling freedom during compilation. In general, predication allows the compiler to convert control dependencies into data dependencies. Predicate registers are generally used in pairs, with one predicate register having the complement of the value of the other predicate register of the pair. Predication allows a processor to execute two execution paths in parallel in which a first predicate register "switches off" a first instruction branch while a second predicate register "switches on" a second instruction branch. However, n-way branching can also be controlled with predicate registers.

The present invention uses a pair of predicate registers to specify whether or not instructions should be executed within a section of code for performance instrumentation. The present invention further requires that the compiler that is used to compile the instrumented application and the operating system on which the instrumented application is executed are both modified to allow a pair of predicate registers to be dedicated for the purpose of selectively enabling the execution of instrumentation code.

By software convention, this pair of predicate registers is not used for any other purpose. In other words, all sources of machine instructions, including assembly language code, are not allowed to modify these registers by convention.

Hence, all applications, device drivers, operating system routines, etc., that execute on a particular machine are compiled so that a pair of predicate registers are dedicated to predicating the execution of instructions that perform instrumentation functions. In addition, the operating system provides one or more operating system calls or privileged functions to set or reset the dedicated pair of predicate registers depending upon whether or not the instrumentation code should be executed.

Alternatively, the processor could be extended to include special predicate registers that would be reserved for this purpose. Hardware-enforced controls associated with the special predicate registers would protect the special predicate registers from modification by user-level code so that the special predicate registers could only be modified by trusted system-level code. In most circumstances, a hardware solution of special predicate registers has an advantage over a software-only restriction/convention because the system is protected in the hardware solution against change by an assembly language programmer. However, the software-only solution has the advantage of being applicable to currently available processors, such as the IA-64 implementation.

Figure 2A:
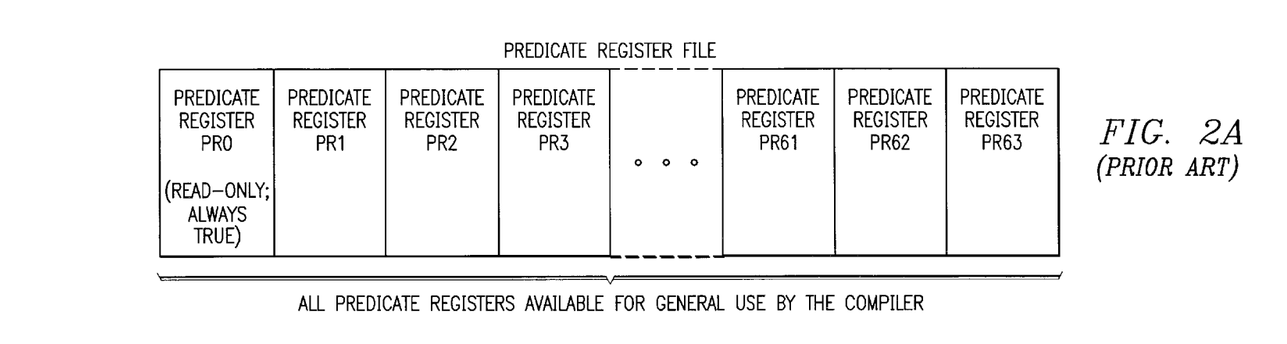
FIG. 2A is a prior art diagram depicting the predicate register file in the IA-64 architecture.

With reference now to FIG. 2A, a prior art diagram depicts the predicate register file in the IA-64 architecture. Predicate registers (PR0–PR63) may be used by an IA-64 compiler to predicate the execution of instructions. In the prior art, all 64 registers are available for general use, although the first register PR0 is read-only and always reads as a one or true.

Figure 2B:
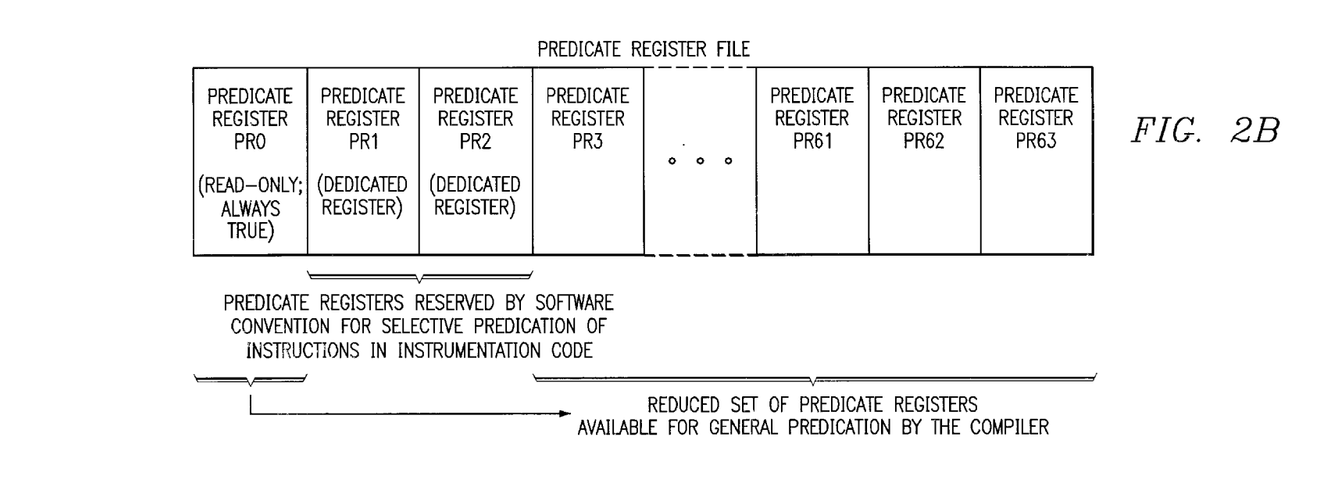
FIG. 2B is a diagram depicting the predicate register file in the IA-64 architecture as used in accordance with the present invention.

With reference now to FIG. 2B, a diagram depicts the predicate register file in the IA-64 architecture as used in accordance with the present invention. Predicate registers (PR0–PR63) may be used by an IA-64 compiler to predicate the execution of instructions. In the present invention, two predicate registers are reserved by software convention to allow the selective predication of instructions in sections of code that implement instrumentation functionality. In FIG. 2B, predicate registers PR1 and PR2 are shown as the predicate registers which are dedicated to the selection of instrumentation, although other registers could be used as the dedicated registers as long as the selection of registers is consistent by software convention. The manner in which the dedicated registers are used to develop measurement information is described in more detail with respect to the other figures.

Figure 3A:
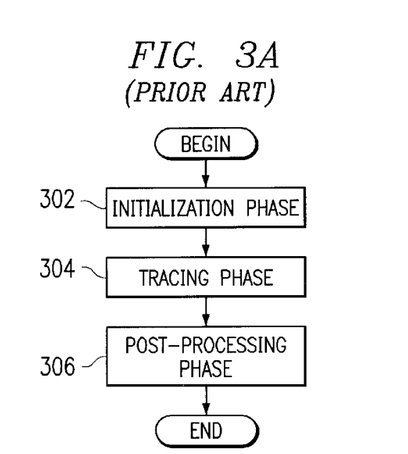
FIG. 3A is a prior art diagram depicting various processing phases that are typically used to develop performance information.

With reference now to FIG. 3A, a prior art diagram depicts various processing phases that are typically used to develop performance information through instrumentation. The flowchart in FIG. 3A shows a general process for instrumenting an application, executing the application, and processing the performance or trace information generated during the execution of the instrumented application. Instrumented code is not typically present in production quality code because instrumentation changes the size and performance of the code to be analyzed; hence, instrumented code is typically not delivered within a final version of an application. After an application has been instrumented with trace hooks, the application may be executed.

Trace records may be produced by the execution of small pieces of code called "hooks". Hooks may be inserted in various ways into the code executed by processes, including static instrumentation through modification of the source code and dynamic instrumentation through modification of a loaded executable. The hooks may invoke functions stored within a dynamic link library. After the hooks have been inserted into the process or processes of interest, i.e., after the code has been "instrumented", then performance monitoring may be performed.

An initialization phase 300 may be used to configure a machine for capturing the state of a machine at the time tracing is initiated. This trace initialization data may include trace records that identify all existing threads, all loaded classes, and all methods for the loaded classes. A record may be written to indicate when all of the startup information has been written.

Next, during the tracing phase 302, trace records are written to a trace buffer or trace file. Trace hooks may be used to record data upon the execution of the hook, which is a specialized piece of code at a specific location in a routine, module, or program. Trace hooks are typically inserted for the purpose of debugging, performance analysis, or enhancing functionality. These trace hooks may generate trace data that is stored in a trace data buffer. The trace data buffer may be subsequently stored in a file for post-processing. Trace records captured from hooks are written to indicate thread switches, interrupts, loading and unloading of classes and jitted methods, etc. Subject to memory constraints, the generated trace output may be as long and as detailed as an analyst requires for monitoring a particular program.

In the post-processing phase 304, the performance information collected in the trace file is analyzed. Each trace record may be processed in a serial manner. Trace records may contain a variety of information. For example, a trace record may identify, directly or indirectly, the thread and method that was being executed at the time that the trace record was generated; this information may be generated originally as binary identifiers that are subsequently converted to text strings. After all of the trace records are processed, the information may be formatted for output in the form of a report or may be used for other post-processing activities. For example, the performance information may be used as performance feedback to the compiler to guide the behavior of the compiler in generating optimized code when recompiling the instrumented application.

More information about tracing and trace processing may be found in the following patent applications: "PROCESS AND SYSTEM FOR MERGING TRACE DATA FOR PRIMARILY INTERPRETED METHODS", U.S. application Ser. No. 09/343,439, Attorney Docket Number AT9-98-849, filed on Jun. 30, 1999, now U.S. Pat. No. 6,553,564; and "METHOD AND SYSTEM FOR MERGING EVENT-BASED DATA AND SAMPLED DATA INTO POSTPROCESSED TRACE OUTPUT", U.S. application Ser. No. 09/343,438, Attorney Docket Number AT9-98-850, filed on Jun. 30, 1999, now U.S. Pat. No. 6,513,155.

Figure 3B:
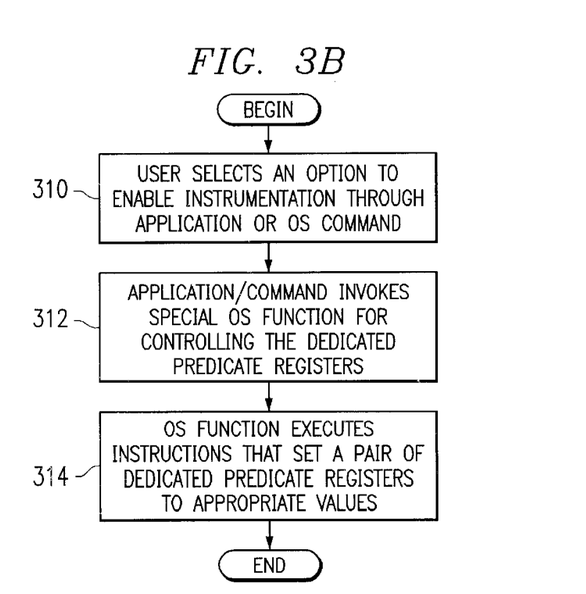
FIG. 3B is a diagram depicting a process for initializing or configuring a data processing system for selective instrument using dedicated predicate register in accordance in present invention.

With reference now to FIG. 3B, a flowchart depicts a process for initializing or configuring a data processing system for selective instrumentation using dedicated predicate registers in accordance with the present invention. Whereas FIG. 3A shows a typical, overall process that may be used to gather performance information, FIG. 3B shows a process, in accordance with the present invention, that would be used during the initialization or configuration phase in order to prepare a data processing system for selective instrumentation. In other words, the process shown in FIG. 3B could be incorporated into the initialization phase shown in FIG. 3A.

As previously described, a pair of predicate registers in the processor are reserved and dedicated for the special purpose of selectively executing instrumentation code. The present invention allows a specialized purpose to be imposed on a general-purpose resource within a processor. Given that the predicate registers are contained within the processor and that the processor does not have any other special control mechanisms for the specialize purpose to be implemented by the present invention, general access to this pair of predicate registers must limited system-wide, and special control for this pair of predicate registers must be implemented. In this manner, a pair of predicate registers that would be available for general predication are "converted" into a pair of dedicated-purpose predicate registers. All applications, device drivers, operating system routines, etc., that execute on a particular machine are specially compiled such that a pair of predicate registers are reserved to predicating the execution of instructions that perform instrumentation functionality. Alternatively, as previously described, a pair of special purpose predicate registers could be engineered into a processor as a more hardware-oriented solution.

The process begins when a user, such as a system administrator or a software development engineer, selects an option within a special application to enable the execution of instrumentation code (step 310). Alternately, the user may invoke a special operating system command through a command line interface. At this point in time, the user merely desires to "turn on" instrumentation code for some type of performance analysis or debugging purpose.

The application or command subsequently invokes a special operating system function for controlling the dedicated predicate registers (step 312). Before executing, though, the special operating system function may require that a special supervisor or privilege mode has previously been set. Hence, at some point, the special application or command may require a special level of user privileges before being executed or before being invoked. The use of controlled user privileges and privileged execution modes is well known in the art.

After verifying the proper privileges, the operating system function executes instructions that configure or set a pair of dedicated predicate registers to the appropriate values (step 314). For example, a default setting might have a first predicate register set to true and a second predicate register set to false, in which case instrumentation code is not executed. When the operation system function is executed, then the values of the predicate registers are toggled so that instrumentation code is executed.

Given that access to the pair of dedicated predicate registers is controlled system-wide, the values in the dedicated predicate registers remain undisturbed until changed under similar privileged circumstances. At some later point in time, the user may desire to "turn off" instrumentation code after performing some type of performance analysis or debugging. A process similar to the process shown in FIG. 3B may be performed in which an opposing operating system function is invoked to reset or reverse the values in the dedicated pair of predicate registers.

The present invention may be used to control a variety of instrumentation or debugging code. One particularly useful purpose for the present invention would be to control the execution of code inserted into an application program to perform array bound checking.

When an application is compiled, only certain types of syntax errors can be found by the compiler as compile-time errors. However, when an application is executed, the application may experience run-time errors based on the manner in which the application was written and the input data that is processed by the application. One of these types of run-time errors is the use of an array index that is outside of the array bounds.

When the application attempts to access an array with an errant array index, the consequences can be unpredictable; a page fault may occur, or the application may write data over its own instructions. An application developer typically has an option to compile an application with array bound checking, which instructs the compiler to insert special array bound checking code into the application at each point that an array index is computed and used. While the software developer is then able to locate a bug in the source code that causes the run-time error, executing the instructions for array bound checking introduces a significant amount of overhead.

The present invention allows an application to be compiled to include the array bound checking code without incurring the execution penalty that would otherwise by incurred without the present invention. The array bound checking instructions may be predicated with the dedicated predicate registers, which allow the array bound checking code to be selectively executed by "turning on" or "turning off" the dedicated predicate registers.

As another example illustrating its usefulness, the present invention may be applied to the instrumentation of spin locks. A spin lock is used to control mutually exclusive access to some resource. If a spin lock is not available, the calling thread is not blocked; instead, the calling thread busy waits or "spins" until the lock becomes available. This facility is intended for use when the delay caused by spinning is expected to be smaller than the delay caused by performing a context switch to another thread and back. The use of a spin lock is generally not recommended on uniprocessor machines or if only one processor of a multiprocessor machine is available because the spinning thread prevents the possible execution of the thread that is holding the lock, thereby possibly deadlocking itself.

Figure 4A:
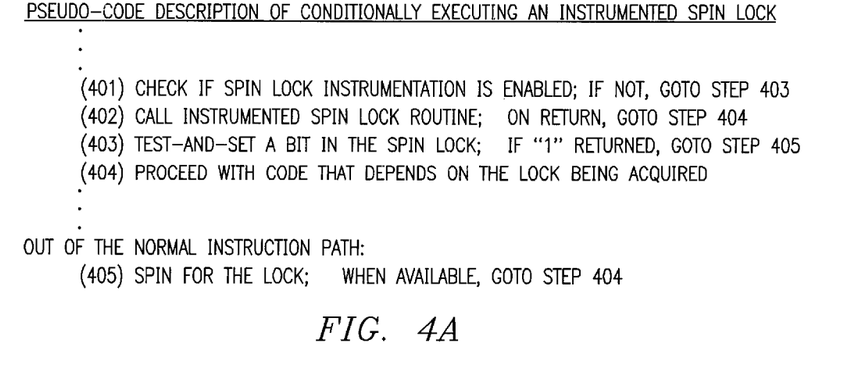
FIG. 4A is a diagram that depicts a typical method of selectively acquiring a spin lock through an instrumented spin lock routine.

With reference now to FIG. 4A, a diagram depicts a typical method of selectively acquiring a spin lock through an instrumented spin lock routine. Without a pair of globally dedicated predicate registers as implemented by the present invention, an instrumented, spin lock acquirement may look like the pseudo-code shown in FIG. 4A. At step 401, a test is performed to check if spin lock instrumentation is enabled, e.g., by checking to see whether or not a global variable indicates that instrumentation is enabled; if not, then execution branches to step 403. At step 402, since spin lock instrumentation is enabled, then the instrumented spin lock routine is called, and upon return, execution branches to step 404, at which point execution proceeds with the remainder of the code that depends upon the lock being acquired.

At step 403, an uninstrumented spin lock is acquired by testing and setting a bit in the spin lock, and if a "one" is returned, i.e. if the test-and-set action is unsuccessful, then the thread must wait for the lock; the code then branches to step 405 (outside the normal instruction path) to spin for the lock, and when it is available, the code branches back to step 404, at which point execution proceeds with the remainder of the code that depends upon the lock being acquired. In this prior art method, the overhead for the spin lock instrumentation is incurred in executing the additional instruction or instructions required for step 401 and the branch to step 403.

Figure 4B:
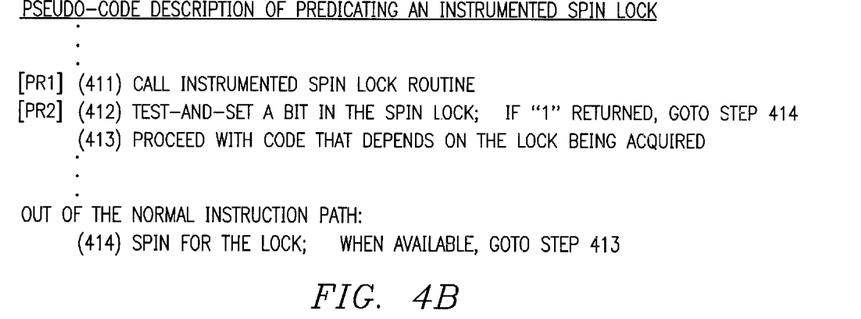
FIG. 4B is a diagram depicting a process of predicating the acquirement of a spin lock through an instrumented spin lock routine in accordance with a preferred embodiment of the present invention.

With reference now to FIG. 4B, a diagram depicts a process of predicating the acquirement of a spin lock through an instrumented spin lock routine. In this example, PR1 and PR2 are the pair of dedicated predicate registers that selectively enable instrumentation. The pseudo-code shown in FIG. 4B assumes that a value pair of (PR1=false, PR2=true) implies that instrumentation is not enabled, and a value pair of (PR1=true, PR2=false) implies that instrumentation is enabled. The notation "[PR1] (XXX)" indicates that the code for step XXX is predicated by predicate register PR1 and is not executed if the value in PR1 is false.

At step 411, predicated with PR1, a call is made to the instrumented spin lock routine. At step 412, predicated with PR2, an uninstrumented spin lock is acquired by testing and setting a bit in the spin lock, and if a "one" is returned, i.e. if the test-and-set action is unsuccessful, then the thread must wait for the lock; the code then branches to step 414 (outside of the normal instruction path) to wait for the lock. At step 414, when the lock becomes available, the code branches back to step 413, at which point execution proceeds with the remainder of the code that depends upon the lock being acquired.

Using a dedicated, global predicate register to control the spin lock instrumentation eliminates the overhead that is required by step 401 in FIG. 4A. At step 411, if PR1 is false, step 411 becomes a NOP and execution proceeds with step 412 at a very small overhead expense compared to the implementation in steps 401–404.

The advantages of the present invention should be apparent in view of the detailed description of the invention that is provided above. The execution of specialized code, such as instrumentation code, debugging code, performance monitoring code, etc., can be selectively controlled at the application level while obtaining a hardware-based performance efficiency of almost zero overhead when the instrumentation code is not executed. Predicated instructions that are not executed consume some of the resources within the processor, for example, by occupying of a portion of the instruction cache and by minimally requiring the operation of an execution unit to NOP a falsely predicated instruction, in which case the resources could have been occupied by other instructions that were not involved with the instrumentation code. However, the amount of resources that are required are minimized, particularly the amount of time that would be expended to check a global variable and possibly to flush the instruction pipeline in the processor. While the amount of time required for checking a global variable and flushing the instruction pipeline may be very small, instrumentation code may have been inserted in many locations in the application, and the summation of the execution times for the checking operation may grow to a large value.

It is important to note that while the present invention has been described in the context of a fully functioning data processing system, those of ordinary skill in the art will appreciate that the processes of the present invention are capable of being distributed in the form of a computer readable medium of instructions and a variety of other forms and that the present invention applies equally regardless of the particular type of signal bearing media actually used to carry out the distribution. Examples of computer readable media include media such as EPROM, ROM, tape, paper, floppy disc, hard disk drive, RAM, and CD-ROMs and transmission-type media such as digital and analog communications links.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for generating an application for use in a data processing system, wherein the data processing system comprises a processor containing a first set of predicate registers, the method comprising:

inserting specific code into an application;

compiling the application for execution on the processor by a compiler; and generating a compiled application in which processor instructions for the specific code are predicated with a second set of one or more predicate registers, wherein the second set of predicate registers is a subset of the first set of predicate registers, wherein the second set of predicate registers is reserved by the compiler for predicating specific code.

2. The method of claim 1 wherein all processor instructions for the specific code are predicated with the second set of predicate registers.

3. The method of claim 1 wherein said specific code comprises instrumentation code.

4. The method of claim 3 wherein said specific code comprises array bound checking instructions inserted into the application by the compiler.

5. The method of claim 3 wherein said specific code comprises debugging instructions inserted into the application by the compiler.

6. The method of claim 3 wherein said specific code comprises performance monitoring instrumentation code.

7. A method for executing an application in a data processing system, wherein the data processing system comprises a processor containing a first set of predicate registers, the method comprising:

loading the application by an operating system for execution, wherein the application comprises specific code in which processor instructions for the specific code are predicated with a second set of one or more predicate registers, wherein the second set of predicate registers is a subset of the first set of predicate registers, wherein the second set of predicate registers was reserved by a compiler of the application for predicating the specific code; and executing the application during which neither the operating system nor other applications use the second set of predicate registers.

8. The method of claim 7 further comprising:

executing the specific code if a first predicate register in the second set of predicate registers indicates a value of true.

9. The method of claim 8 further comprising:

invoking an operating system function to set the first predicate register to a value of true.

10. The method of claim 8 further comprising:

invoking an operating system function to set the first predicate register to a value of false.

11. The method of claim 7 further comprising:

not executing the specific code if a second predicate register in the second set of predicate registers indicates a value of false.

12. A method for executing an application in a data processing system, wherein the data processing system comprises a processor containing a first set of predicate registers, the method comprising:

loading the application by an operating system for execution, wherein the application comprises specific code in which processor instructions for the specific code are predicated with a second set of one or more predicate registers, wherein the processor comprises the second set of predicate registers reserved for predicating the specific code; and executing the application.

13. The method of claim 12 wherein said specific code comprises instrumentation code.

14. The method of claim 12 wherein said specific code comprises array bound checking instructions inserted into the application by the compiler.

15. The method of claim 12 wherein said specific code comprises debugging instructions inserted into the application by the compiler.

16. The method of claim 12 wherein said specific code comprises performance monitoring instrumentation code.

17. A processor for use in a data processing system comprising:

a first set of predicate registers;

a second set of one or more predicate registers that are distinct from the first set of predicate registers, wherein the second set of one or more predicate registers is reserved for predicating specific code within an application; and execution means for executing instructions within the application.

18. An apparatus for generating an application for use in a data processing system, wherein the data processing system comprises a processor containing a first set of predicate registers, the apparatus comprising:

inserting means for inserting specific code into an application;

compiling means for compiling the application for execution on the processor by a compiler; and generating means generating a compiled application in which processor instructions for the specific code are predicated with a second set of one or more predicate registers, wherein the second set of predicate registers is a subset of the first set of predicate registers, wherein the second set of predicate registers is reserved by the compiler for predicating specific code.

19. The apparatus of claim 18 wherein all processor instructions for the specific code are predicated with the second set of predicate registers.

20. A computer program product on a computer readable medium for use in a data processing system for executing an application in the data processing system, wherein the data processing system comprises a processor containing a first set of predicate registers, the computer program product comprising:

instructions for loading the application by an operating system for execution, wherein the application comprises specific code in which processor instructions for the specific code are predicated with a second set of one or more predicate registers, wherein the second set of predicate registers is a subset of the first set of predicate registers, wherein the second set of predicate registers was reserved by a compiler of the application for predicating the specific code; and instructions for executing the application during which neither the operating system nor other applications use the second set of predicate registers.

21. The computer program product of claim 20 further comprising:

instructions for executing the specific code if a first predicate register in the second set of predicate registers indicates a value of true.

22. The computer program product of claim 21 further comprising:

instructions for invoking an operating system function to set the first predicate register to a specified value.

23. A computer program product on a computer readable medium for use in a data processing system for executing an application in the data processing system, wherein the data processing system comprises a processor containing a first set of predicate registers, the computer program product comprising:

instructions for loading the application by an operating system for execution, wherein the application comprises specific code in which processor instructions for the specific code are predicated with a second set of one or more predicate registers, wherein the processor comprises the second set of predicate registers reserved for predicating the specific code; and instructions for executing the application.

24. The computer program product of claim 23 wherein said specific code comprises instrumentation code.

25. The computer program product of claim 23 wherein said specific code comprises array bound checking instructions inserted into the application by the compiler.

26. The computer program product of claim 23 wherein said specific code comprises debugging instructions inserted into the application by the compiler.

27. The computer program product of claim 23 wherein said specific code comprises performance monitoring instrumentation code.

* * * * *